United States Patent
Sun et al.

(10) Patent No.: US 8,220,053 B1
(45) Date of Patent: Jul. 10, 2012

(54) SHADOW COPY-BASED MALWARE SCANNING

(75) Inventors: Edward Sun, Nanjing (CN); Zhihe Zhang, Nanjing (CN); Xiaodong Huang, Nanjing (CN); Flanker Lu, Nanjing (CN)

(73) Assignee: Trend Micro, Inc., Tokyo (JP)

( * ) Notice: Subject to any disclaimer, the term of this patent is extended or adjusted under 35 U.S.C. 154(b) by 812 days.

(21) Appl. No.: 12/146,909

(22) Filed: Jun. 26, 2008

(51) Int. Cl.
*G06F 21/00* (2006.01)
(52) U.S. Cl. ........................................... 726/24
(58) Field of Classification Search .................... 726/24; 713/188; 711/111, 162, E12.093, E12.001, 711/E12.103
See application file for complete search history.

(56) References Cited

U.S. PATENT DOCUMENTS

| | | | |
|---|---|---|---|
| 2004/0158730 A1* | 8/2004 | Sarkar | 713/200 |
| 2004/0177243 A1* | 9/2004 | Worley, Jr. | 713/2 |
| 2006/0137010 A1* | 6/2006 | Kramer et al. | 726/22 |
| 2006/0225065 A1* | 10/2006 | Chandhok et al. | 717/168 |

* cited by examiner

*Primary Examiner* — Gilberto Barron, Jr.
*Assistant Examiner* — David Le
(74) *Attorney, Agent, or Firm* — Beyer Law Group LLP

(57) ABSTRACT

Scanning of the shadow copy instead of the hard disk of a computer (using an accessing interface instead of the file system interface or an API of the operating system) enables the scanning software to access any files that might have been locked by the malware on the hard disk and avoids root kits. Files cannot be locked because a disk parser is used instead of the operating system or normal file system interface. It is possible for malware to change or reinfect files during the scanning and cleaning process. Files on the hard disk in existence at the time a manual scan is begun are scanned and backed up to the cache if changed during scanning. Dropped malware is removed by reverting the hard disk to the shadow copy once scanning and cleaning has been performed. Even if a watchdog drops a file during the scanning and cleaning process (because it detects that other malware components are being affected) these dropped files will be removed.

23 Claims, 6 Drawing Sheets

Service Architecture

Shadow Copy Creation Process

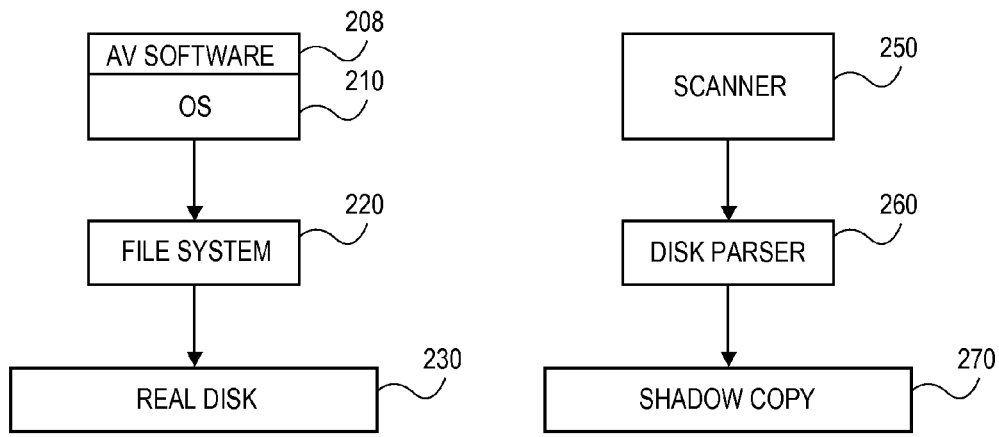
FIG. 3A
(PRIOR ART)
FIG. 3B
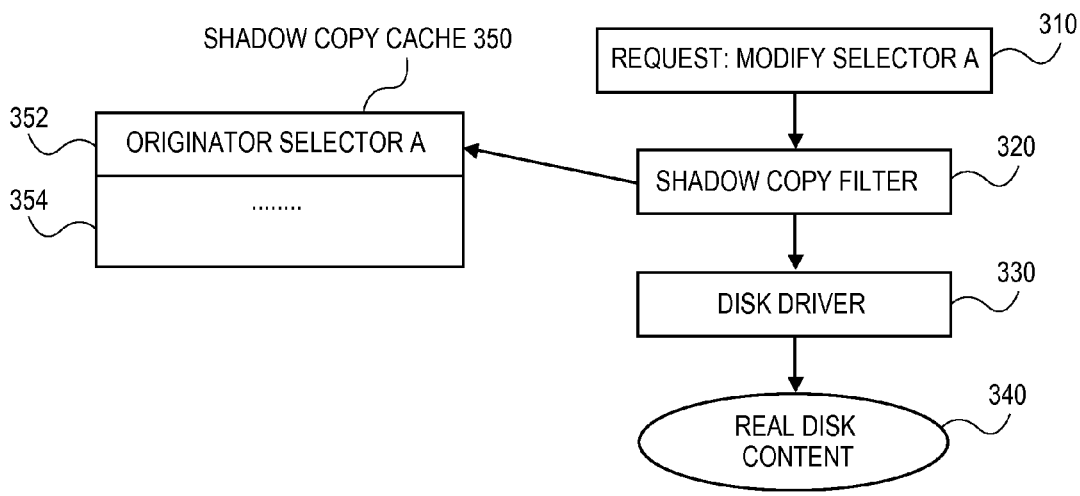
FIG. 4

SHADOW COPY-BASED MALWARE SCANNING

FIELD OF THE INVENTION

The present invention relates generally to detection of computer viruses. More specifically, the present invention relates to scanning for malware using a shadow copy.

BACKGROUND OF THE INVENTION

Currently, computer viruses and other types of malware continue to plague computers and computer networks. While continual efforts are made to prevent, detect and eliminate malware from computers, the malware itself also continues to evolve and evade detection.

As known in the art, scanning provides users the capability to detect and clean computers infected by known malware. When malware is first reported, an antivirus software company typically analyzes the malware, produces a (or updates the) pattern file that identifies the malware, and releases that pattern to the public for use in detecting the malware. Typically, a pattern file may be downloaded by a user immediately upon its availability (perhaps in a pre-release version), and a compilation of pattern files are available periodically in an official release. The pattern file and a virus scan engine work hand-in-hand to enable a variety of software products to detect the latest malware, whether embodied in a file, application software, or other.

One previous technique used to combat malware involves an antivirus software product that uses the application programming interface (API) of an operating system in order to manually scan a file suspected of containing malware. An enhanced API may also be used to provide more powerful file enumeration.

Unfortunately, a manual scan (or scheduled scan) of software files on disk using the API of the computer operating system has drawbacks. Scanning of a file using an API is not effective in all cases if malware locks the file such that it may not be scanned. For example, malware may utilize the existing operating system to lock any of its component files or other files to prevent them from being scanned for viruses. Secondly, prior art techniques may not be able to identify all types of root kit malware—this type of malware is sophisticated enough to be able to hide from detection and cleaning. And because root kit malware technology also changes rapidly in order to avoid detection, many infected files may avoid detection during scanning. Thirdly, such prior art techniques may be ineffective if the disk being scanned is modified during the scan—a file consistency problem.

Finally, a prior art scan cannot deal effectively with recursively dropped files due to a "watchdog." A watchdog is a component of malware that monitors the other various components of the malware (malicious files, registry keys, etc.), detects when any of these components have been scanned or removed by virus cleaning software, and then recursively drops these components back into place in order to recover from the cleaning action. A normal scanning and cleaning cannot deal effectively with this type of malware because the malware can recover and replace itself even after the cleaning. In particular, if cleaning software fails to find and remove the watchdog component first, the watchdog will recursively drop files as the other components are removed.

For all these reasons, it would be desirable to improve upon current malware scanning techniques in order to provide better detection and cleaning of malware.

SUMMARY OF THE INVENTION

To achieve the foregoing, and in accordance with the purpose of the present invention, a malware scanning technique is disclosed that utilizes shadow copy technology in order to more effectively detect and clean malware. The invention enhances the consistency of scanning, increases the ability to detect root kit-based malware, handles locked files and dropped files, and generally improves cleaning of infected computers.

The shadow disk concept includes unchanged sectors on the hard disk along with original sectors stored in the shadow disk cache. Because the scan of a shadow disk actually means a scan at a particular point in time of the hard disk, this scan will include the unchanged sectors on the hard disk and original sectors in the cache. A modified sector of the hard disk that was modified after the particular point in time would not be scanned; the original, unmodified sector would be scanned from the shadow copy cache.

The present invention detects root kit-based malware better than previous techniques. Because most root kits hide malware files by filtering content accessed using an operating system component (e.g., the file system interface or a Microsoft operating system API), the present invention use a separate accessing interface and shadow copy which does not allow a root kit to hide files.

In one embodiment, the present invention provides more effective scanning technology. For example, scanning of the shadow copy instead of the hard disk of a computer (using an accessing interface instead of the file system interface or an API of the operating system), enables the scanning software to access any files that might have been locked by the malware on the hard disk. Files cannot be locked by the malware because an accessing interface (such as a disk parser) is used instead of the operating system or normal file system interface. Malware is only able to lock a file when the operating system API or file system interface is used.

Malware does not know of the existence of a shadow disk and its accessing interface. Malware simply locks a particular file on the hard disk in order to prevent the normal operating system API from accessing the file. But, use of a separate accessing interface to access the shadow disk will not be blocked by malware. A disk parser is one way to implement the accessing interface. Other methods to access the shadow disk in order to implement the accessing interface include an embedded hardware component that understands the format of disk. Alternatively, the file system interface or traditional operating system API may be used to perform scanning and cleaning; locked files may occur, but files dropped by watchdog malware would still be prevented by virtue of use of the shadow copy as described below.

In another embodiment, the present invention effectively deals with the file consistency problem. It is possible for malware to change or reinfect files during the scanning and cleaning process. Through use of shadow copy technology, the present invention effectively deals with this problem and ensures that the files on the hard disk in existence at the time a manual scan is begun are scanned. Changes to the disk during the scanning and cleaning process are handled by reverting the hard disk to the shadow copy once scanning and cleaning has been performed.

Prior art techniques were ineffective at removing watchdog malware primarily because these techniques were unable to find the watchdog malware and disable it. Once cleaning was performed, the watchdog simply dropped the infected files again. Advantageously, use of the shadow copy technology in conjunction with the present invention prevents watchdog malware from operating. Even if a watchdog drops a file during the scanning and cleaning process (because it detects that other malware components are being affected) these dropped files will be removed. In other words, use of the present invention avoids the need to detect the watchdog malware in the first place because even if the watchdog is not detected and removed, the files it drops during scanning and cleaning will be removed as described below.

The original sectors on disk at the start of the scanning and cleaning are included in the shadow copy "snapshot" at that point in time. If changed, the original sectors will be backed up to the cache, and then these original sectors will be rewritten back to the hard disk at the end of the scanning and cleaning. Thus, any sectors modified on the hard disk during scanning and cleaning by malware (such as a watchdog) will be overwritten by the original sectors that were present at the start of the scanning and cleaning. Even if these original sectors have been infected by malware since the previous scan, the sectors will be cleaned in the shadow copy cache before they are reverted to the hard disk. After the entire cleaning process, any malware components (including any watchdog components) will have been cleaned from the shadow copy, so the invention may securely revert the physical hard disk to the cleaned shadow copy.

BRIEF DESCRIPTION OF THE DRAWINGS

The invention, together with further advantages thereof, may best be understood by reference to the following description taken in conjunction with the accompanying drawings in which:

FIG. 3A shows a classic, prior art scanning technique.

FIG. 3B shows an improved scanning technique using a shadow copy.

FIG. 4 illustrates an embodiment in which the shadow copy technology backs up a sector that is about to be changed.

DETAILED DESCRIPTION OF THE INVENTION

Figure 1:
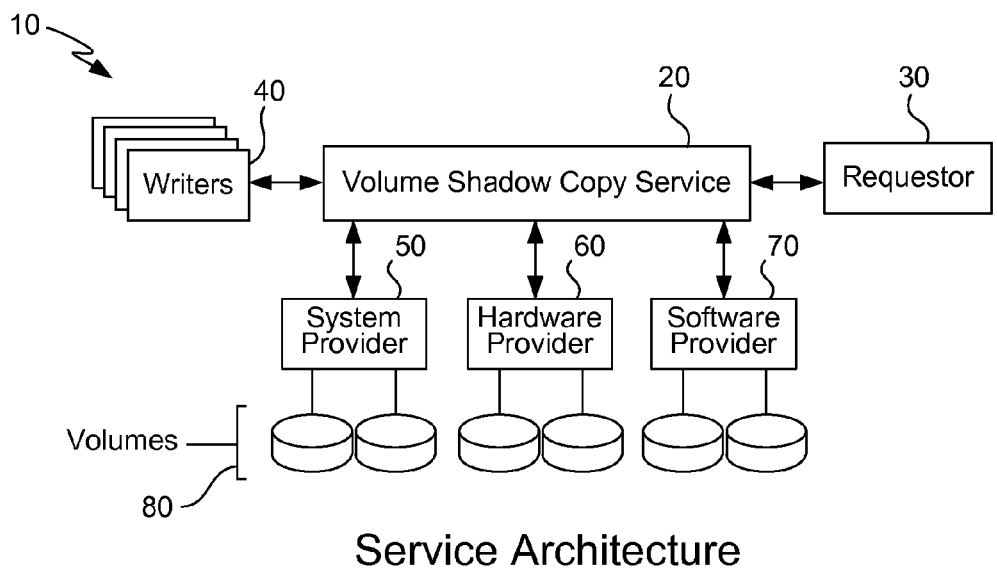
FIG. 1 illustrates a prior art architecture diagram including a volume shadow copy service.

The present invention is applicable to all malicious software, or malware, that generally causes harm to a computer system, provides an effect that is not expected by the user, is undesirable, illegal, or otherwise causes the user to want to restore their computer system from a time prior to when it was infected by the malware. Malware can be classified based upon how it executes, how it spreads or what it does. Malware generally includes a computer virus, worm, Trojan horse, backdoor, exploit, key logger, etc.

Grayware refers to software that causes annoying and possibly undesirable or unforeseen behavior in the way a program runs. Grayware is not necessarily detrimental to basic system operations, but it harbors the risk of opening computer vulnerabilities. Some applications classified as grayware are misused for malicious activity while others transmit information about a computer user's behavior. Grayware includes spyware, adware, dialers, hacking tools, joke programs, data miners (tracking cookies), password cracking applications and remote access tools.

The below descriptions are provided as guidelines for the types of malware currently existing; these classifications are not exact in that many groups overlap. For example, commercially available so-called "anti-virus" software is designed to scan a computer for viruses and worms, as well as for other malicious software. Of course, later developed software not currently known may also fall within the definition of malware. As used herein, the term malware is used to describe both the examples of malware and grayware described herein.

A root kit is software inserted into a computer system after an attacker has gained control of the system. Root kits often include functions to hide the traces of the attack, as by deleting logged entries or by cloaking the attacker's processes. Root kits might include backdoors, allowing the attacker to easily regain access later or to exploit software to attack other systems. Because they often hook into the operating system at the kernel level to hide their presence, root kits can be very hard to detect.

A Trojan horse program is a harmful piece of software that is often disguised as legitimate software. Trojan horses cannot replicate themselves, unlike viruses or worms. A Trojan horse can be deliberately attached to otherwise useful software by a programmer, or can be spread by tricking users into believing that it is useful. Some Trojan horses can spread or activate other malware, such as viruses (a dropper).

Shadow Copy Technology

An existing technology from Microsoft Corporation, termed the Volume Shadow Copy Service, provides backup capability as well as point-in-time copies of data known as shadow copies. This technology is used by Microsoft operating systems to perform "snapshot and restore" actions as well as "system restore" actions. There are two methods for creating shadow copies: making either a complete copy (a clone) or copying only the changes to the volume (a differential copy or "copy-on-write"). Each method results in two data images: the original volume and the shadow copy volume. The functional difference between the two is that the original volume maintains full read/write capabilities, whereas the shadow copy volume is read-only. Preferably, the present invention makes use of the "copy-on-write" method. Of course, this shadow copy technology may be used in other operating systems using the same general principles but with different implementations.

The copy-on-write method creates shadow copies that are differential rather than full copies of the original data. The copy-on-write method can produce shadow copies using either software or hardware techniques. This method makes a copy of the original data before it is overwritten with new changes. When a change to the original volume occurs, but before it is written to disk, the block about to be modified is read and then written to a cache, which preserves a copy of the data block before it is overwritten with the change. Using the blocks in the cache and unchanged blocks in the original volume, a shadow copy can be logically constructed that represents the shadow copy at the point in time in which it was created.

The advantage of the copy-on-write method is that it creates shadow copies very rapidly because it is only writing the changes to disk. The disadvantage is that in order to fully restore the data, the original data must still be available.

Another disadvantage is that the performance of copy-on-write implementations can affect the performance of the original volume.

FIG. 1 illustrates a prior art architecture diagram 10 including a volume shadow copy service. Included within the architecture is a volume shadow copy service 20 that coordinates components to create shadow copies of one or more volumes of a computer system. A requester 30 is typically a software application that requests that a shadow copy be made of a particular volume. Writer 40 is a component of an application that stores persistent information on volumes using shadow copy; typically, the application is a database or a system service. System provider 50 is a component that creates and maintains the shadow copies, such as that found in an operating system. Hardware provider 60 also creates and maintains shadow copies, such as a provider included with a storage array. Software provider 70 likewise creates and maintains shadow copies. Volumes 80 include source volumes that contain the data from which a shadow copy is made, and storage volumes that hold the shadow copy storage files.

Figure 2:
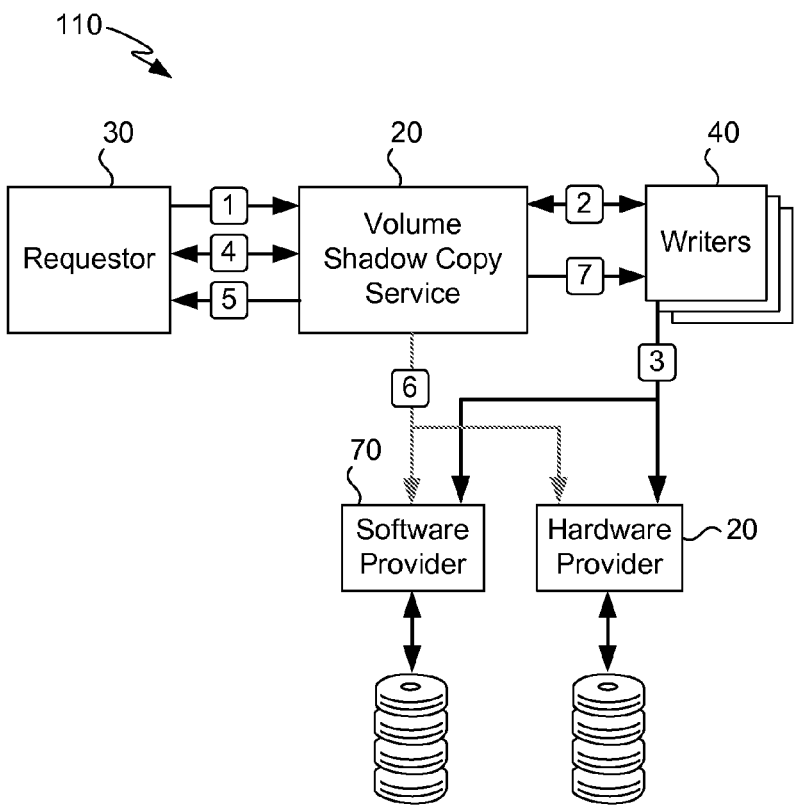
FIG. 2 illustrates a prior art shadow copy creation process.

FIG. 2 illustrates a prior art shadow copy creation process 110. This process creates a shadow copy; coordination is provided by copy service 20. At 1 requester 30 asks copy service 20 to prepare for shadow copy creation. At 2 writer 40 creates a description of the backup components and defines the restore method. The copy service notifies the writer to prepare its data for making a shadow copy. At 3 the writer prepares the data. When the data is prepared for shadow copy creation the writer notifies the copy service 20. At 4, copy service 20 initiates the "commit" shadow copy phase. At 5 copy service 20 tell the writers to queue data and freeze requestor I/O write requests during the several seconds required to create the shadow copy of the volume or volumes. Copy service 20 then flushes the file system buffer and freezes the file system, thus ensuring that file system metadata is written and that the data is written in a consistent order. At 6, copy service 20 tells the appropriate provider to create the shadow copy. At 7 the copy service 20 removes the freeze on I/O write requests. Once the shadow copy is created, copy service 20 releases the writers from their temporary inactive phase and all queued write I/O requests are completed. Next, copy service 20 queries the writers to confirm that write I/O requests were successfully held during shadow copy creation. If the write requests were not successfully held, the shadow copy is deleted and the requester is notified. If the copy is successful, copy service 20 gives the location information for the shadow copy back to the requester.

Shadow Copy-Based Scanning Overview

The present invention recognizes that shadow copy technology may be used to logically create a "snapshot" of existing file or files; once the snapshot exists, then the present invention detects any malware, and cleans the malware from the files in the snapshot. A point-in-time snapshot of a computer system disk is created using the shadow copy service described above or using other suitable shadow copy technology.

A shadow copy cache is created in virtual memory (or in another suitable memory location); a shadow copy filter is used to filter all sector modifications of the system disk during scanning and cleaning. If a particular sector is modified, the original sector is cached in the shadow copy cache using the disk filter. This approach keeps a point-in-time view of the shadow copy current. A time index of when a sector is modified is also associated with each original sector. The time index indicates when the modified sector was placed on disk, thus, a snapshot at any point in time of the hard disk may be obtained by reference to a particular time index. For example, if a snapshot is desired before a particular time index, then sectors modified at or after that time index would not be retrieved.

Once a manual scan of the actual computer system disk is requested, a shadow copy "snapshot" is created for that particular point in time when the manual scan is requested and filtering begins. The snapshot indicates the contents of the hard disk at that particular point in time through use of the shadow copy. A shadow copy logically exists because the shadow copy filter is continuously backing up changed sectors to the shadow disk cache. A virus scan of the shadow copy is then initiated. A scan of the shadow copy includes unchanged sectors on the hard disk and any backed up sectors in the cache.

During the scan of the shadow copy if any malware is detected it is cleaned directly from the shadow copy. Such a scan and cleaning will be successful because the shadow copy is accessed using any suitable accessing interface (such as a disk parser) rather than the file system interface or the API of the operating system. Any malware present will not be able to lock any files in the shadow copy. Any files that are dropped during the scanning and cleaning will also have no effect because the hard disk is reverted to the shadow copy once scanning and cleaning has finished.

After the scanning and cleaning of the shadow copy, if any modifications have been made to the shadow copy then the scan engine will replace the actual disk with the contents of the shadow copy. This replacement may take place at the file level or sector level, and may require a rebooting of the system. If no modifications were made on the shadow copy then the scan engine can simply discard the shadow copy cache.

Shadow Copy-Based Scanning Architecture

FIG. 3A shows a classic, prior art scanning technique. Antivirus software 208 uses an API of the operating system 210 of a computer to access its file system 220 in order to perform a virus scan of the physical hard disk 230 of the computer. Such a technique is common with all brands of computers and operating systems. Because the antivirus software is using the operating system and the file system in order to perform the scan of the hard disk, sophisticated malware may take advantage of this information and monitor the progress of the scan or any actions that the scan produces. Because the malware knows that antivirus software will be using the operating system and file system, it is possible for certain types of malware (as described above) to thwart these efforts and avoid detection, lock files, recursively drop files, etc. Advantageously, the present invention recognizes this drawback with the current technique and has an improvement.

FIG. 3B shows an improved scanning technique using a shadow copy. Using this technique, a shadow copy for the physical hard disk is created and this shadow copy is scanned using a disk parser (an example of a suitable accessing interface), rather than using an API of the computer's operating system or the file system interface. Scanning software 250 is any suitable antivirus software or other scanning software suitable for detecting all kinds of malware. Typically, such antivirus software uses a virus pattern file in order to detect malware. Preferably, the scanning software is initiated using a manual scan (the user sets up periodic, scheduled scanning times or manually initiates a scan at will). Preferably, the present invention operates best with manual scanning; use of a real-time scan would utilize a great deal of system resources. In addition, because a real-time scan is initiated when the disk changes (for example when a virus drops a file), any snapshot at that time would not effectively include any activity or changes after the file has been dropped and the malware begins to work. In other words, creating a snapshot of the disk in conjunction with a real-time scan would likely not include the malware in the snapshot. By contrast, a periodic manual scan will be able to capture much more malware activity.

Disk parser 260 is a parsing program that is able to read and parse raw file information stored on the shadow copy. For example, the shadow copy will be written in the same format as the actual hard disk, using a file system such as NTFS, FAT, EXT or an Apple file system. The parser will understand the disk contents in a particular file system format and be able to read that raw data. For example, if NTFS is used, the disk parser will read and parse its partition table in order to understand the files on the shadow copy. Of course, a disk parser is one example of a suitable accessing interface or scanning the shadow copy 270.

FIG. 4 illustrates an embodiment in which the shadow copy technology backs up a sector that is about to be changed. As discussed above, it is preferable that the shadow copy technology used (e.g., the Volume Shadow Copy Service) implement a "copy-on-write" method. This method means that when a sector of the disk is to be modified, the original sector is first written to a shadow copy cache before that original sector of the disk is rewritten with the new information. As shown, a request 310 indicates that a particular sector of the disk will be modified. This request is intercepted by a shadow copy filter 320 arranged to note requests for sector changes. The shadow copy filter operates to copy the original sector to the shadow copy cache 350. Cache 350 may be any suitable storage area in a computer system such as memory or disk. As shown, the cache includes the original sector 352 along with other original sectors 354. Once the original sector has been copied, a disk driver 330 is enabled to overwrite the original sector with the new, modified sector to the physical hard disk 340. Backup of sectors in this manner to the cache is performed constantly as sectors are modified.

Figure 5:
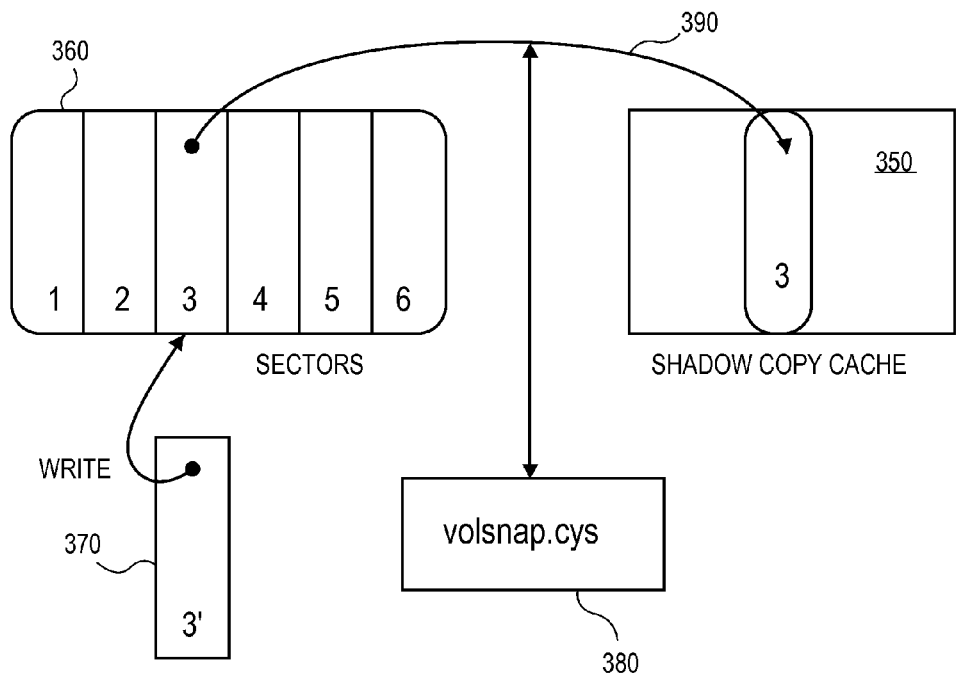
FIG. 5 illustrates in more detail a sector being written to the cache.

FIG. 5 illustrates in more detail a sector being written to the cache. Shown is the shadow copy cache 350 and various sectors 1-6 of the hard disk 360. In this example, sector 3 will be modified and a new sector 370 is about to overwrite the original sector 3. The modification could be due to a file deletion, the addition of a file, changes to a file, etc. Any suitable shadow copy filter, such as "volsnap.sys" 380 intercepts the request to modify sector 3 and operates to backup sector 3 by writing 390 the original sector into the shadow copy cache 350.

Figure 6:
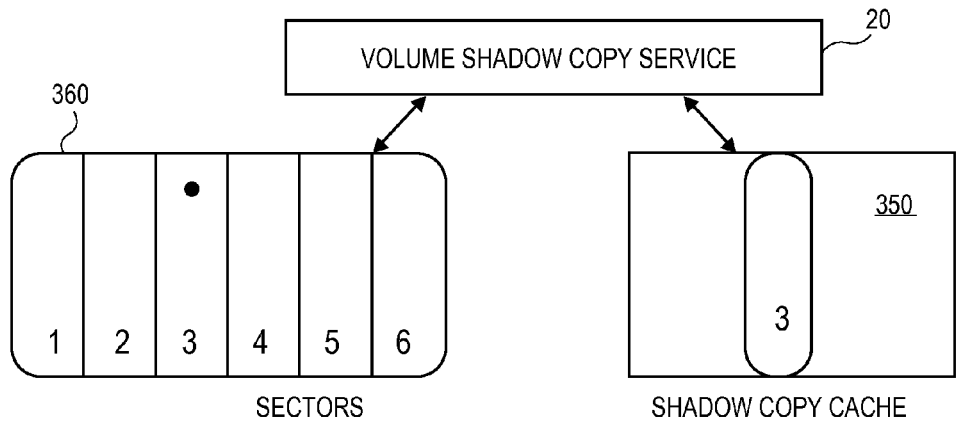
FIG. 6 illustrates coordination by the shadow copy technology when files are retrieved.

FIG. 6 illustrates coordination by the shadow copy technology when files are retrieved. At a particular point in time, various sectors 360 of the hard disk exist in a particular state. Previously, any of a number of sectors had been overwritten and the original sectors had been stored in shadow copy cache 350. Any suitable shadow copy technology, such as Volume Shadow Copy Service 20, operates to merge sectors of the hard disk with the shadow copy cache when access to the shadow copy is desired. For example, should a user wish to access the shadow copy at a point in time before sector 3 was modified, then shadow service 20 provides sectors 1, 2, 4, 5 and 6 and also accesses cache 350 in order to provide a copy of the original sector 3. The shadow service 20 may provide access at any particular point in time and may of course perform more complex merges. A merge coordinated by the shadow service typically occurs when the user (or software) attempts to access the disk.

Figure 7:
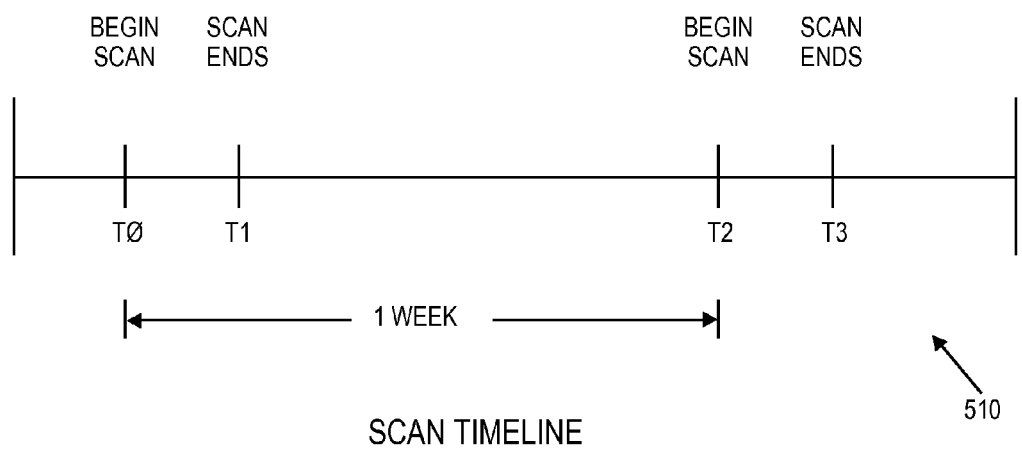
FIG. 7 illustrates a scan time line.

FIG. 7 illustrates a scan timeline 510. In this example, a scan is begun at time T0 and is completed at time T1. Typically, a full system scan using the present invention takes on the order of one half hour to an hour. A scan may then be performed one week later at time T2, finishing at time T3. Scans may be performed at greater or lesser intervals, such as every day, every few weeks, etc. each time a scan is performed, a snapshot for that time point is created. Thus, a snapshot created in association with the scan beginning at time T2 will contain all changes to files (including any files infected by malware) made during the previous week. The present invention effectively handles malware operating between times T0 and T1, for example.

Shadow Copy-Based Scanning Flowchart Example

Figure 8:
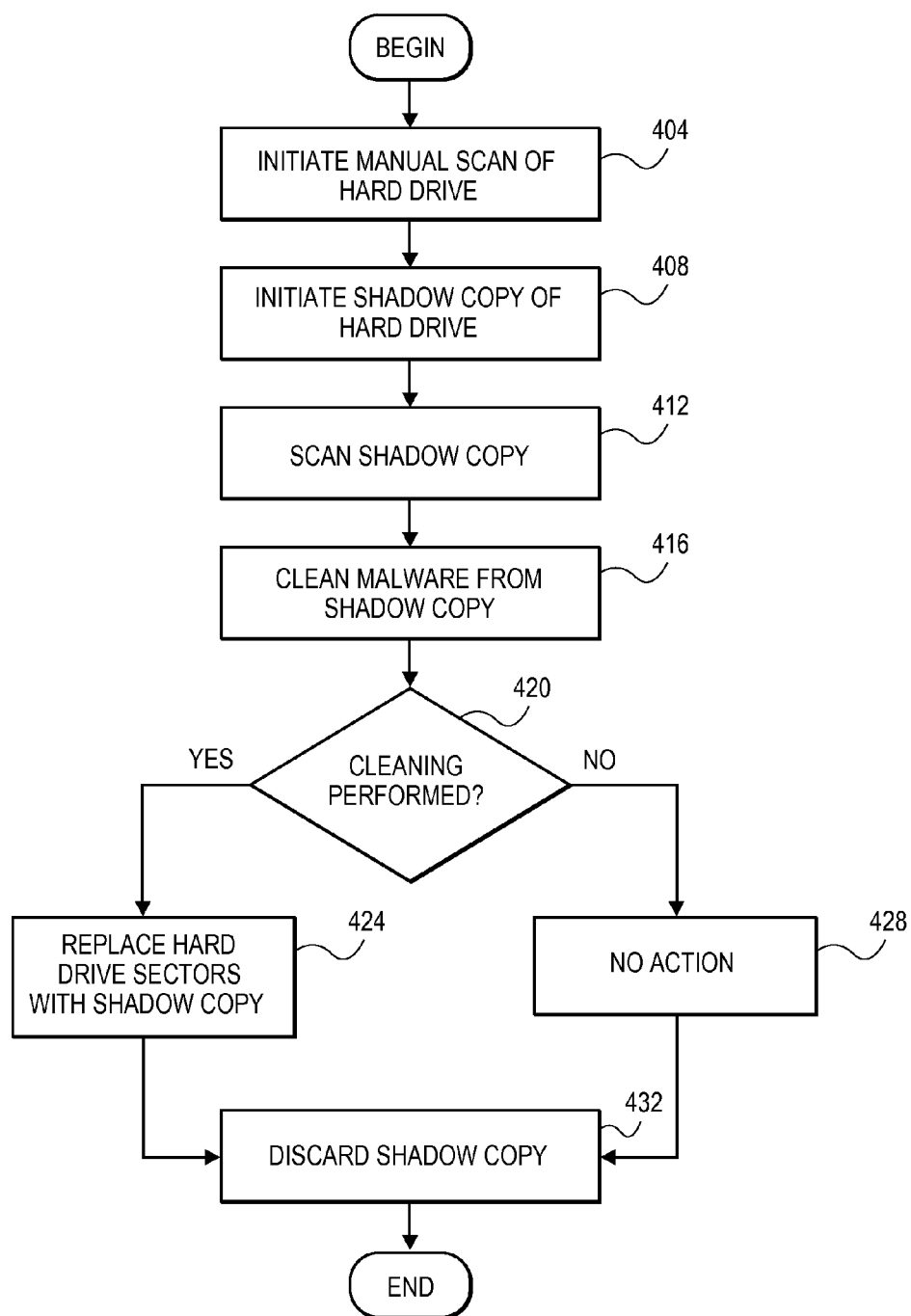
FIG. 8 is a flowchart describing one embodiment for completing the scan of a computer system disk.

FIG. 8 is a flowchart describing one embodiment for completing the scan of a computer system disk.

Step 404 initiates a manual scan (user initiated or scheduled) of the hard drive using scanner 250. Preferably, the operating system of a computer is used to initiate the manual scan; typically, the user initiates a scan by clicking a button on a graphical user interface causing the scanner to be executed and calling the disk parser's (for example) interface. The operating system and file system interface are bypassed when the actual files on disk are accessed.

In step 408 a shadow copy is initiated for the hard drive of the computer when the manual scan is initiated. The shadow copy technology used will maintain the shadow copy during the duration of the scanning and cleaning. During this period, the shadow copy technology will continuously backup any changed the sectors of the hard drive to the shadow copy cache in real time. Initially, the shadow copy is essentially all the sectors on the hard disk as no changes have occurred yet. But, if the sector is modified after initiation of the scan then the original sector will be written to the cache, will be part of the shadow copy and will be scanned in the cache.

This shadow copy "snapshot" represents the view of the hard disk at the beginning of the manual scan and conceptually includes all contents of the disk at that time. Typically, the shadow copy service keeps track of the shadow copy snapshot at this particular point in time through use of a unique identifier such as a shadow copy identifier, a shadow copy name or a shadow copy time.

As described above, a shadow copy may be implemented using the Microsoft Volume Shadow Copy Service or any other suitable shadow copy technology. Preferably, the shadow copy is implemented as "copy-on-write" such that only changed sectors are backed up to the shadow copy cache. Accordingly, the shadow copy keeps track of changes to sectors to the hard disk and will back up any sectors that are changed during the scanning. Accordingly, if any sector is changed by malware during scanning the original sector will be backed up to the cache. Thus, if a request is made for a particular sector as it existed at the initiation of the manual scan and if the sector has been unchanged, then the request is directed to the actual hard disk, whereas if the sector had been changed then the request is directed to the shadow copy cache.

In step 412 a scan of the shadow copy is performed. This scan results in sectors of the hard disk being scanned and perhaps backed up sectors in the cache also being scanned. This scanning makes use of scanner 250 and disk parser 260. Preferably, the disk parser accesses the shadow copy without using a file system interface and without using any API of the operating system. It is also possible for the disk parser to access the disk or cache using hardware instructions and to bypass the operating system entirely. One skilled in the art will be able to design a suitable implementation for disk access. Advantageously, avoiding use of any API of the operating system means that malware cannot monitor progress of the scanning and will not be able to lock files.

In one specific embodiment, the parser reads sectors or writes to sectors using pure hardware technology (e.g., I/O instructions), or relies on an operating system bus driver or on an operating system disk driver to perform reads and writes. In this fashion, the accessing interface implemented by the parser bypasses the file system interface and any operating system API interface.

If malware has modified a sector on the hard disk before the manual scan is initiated, then the malware exists in that sector on the hard disk and not in the cache. The modified sector on the hard disk would then be scanned. In this scenario, the scanner would detect the malware in the modified sector on the hard disk and this sector would eventually be cleaned directly on the hard disk. Even if malware attempts to reinfect this sector on the hard disk after it has been cleaned (such as a watchdog component recursively dropping a file), the present invention addresses this problem. Once the malware attempts to write to this sector, the original, cleaned sector will be backed up to the shadow disk cache. The sector on disk will be reinfected with malware, but this situation is remedied in step 424 below.

By contrast, if the original sector is clean, and malware modifies that sector on the hard disk after the manual scan has begun (but before that particular sector is scanned), then the original sector will be backed up to the cache and that original sector will be scanned from the cache because it existed at the point in time when the manual scan was initiated. This original sector will not be cleaned because no malware will be found. The modified sector on the hard disk would not be scanned because the modified sector did not exist at the time the scan was initiated.

Alternatively, if the original sector is clean, and malware modifies that sector on the hard disk after the manual scan has begun (but after that particular sector is scanned), then the original sector will be backed up to the cache. The original sector will be scanned on the hard disk and no cleaning would be performed because the original sector was clean. Once malware modifies the sector after scanning, the original sector is backed up to the cache and malware then exists on the sector on the hard disk. The modified sector on the hard disk would not be scanned because that modified sector did not exist at the time the scan was initiated.

In either of the above two scenarios (original sector is clean, malware modifies a sector after the manual scan is begun), one embodiment of the invention contemplates that the modified sector on the hard disk will contain malware, and no cleaning will be performed because the original sector is clean. In these scenarios under a first embodiment, no action is taken in step 428 below because no cleaning was detected in step 420 below. The malware present in the modified sector will exist until the time that the next manual scan is performed. This embodiment may not be the most secure approach but will take less time to complete because not all sectors will be reverted. This embodiment acknowledges that scanning is periodical and that an infection may occur after a scan has begun.

In a second embodiment for the above two scenarios, the present invention contemplates that all sectors on the hard disk will be reverted to original sectors backed up in the cache. This embodiment would be the most secure approach, but will take more time to complete as all sectors present in the shadow copy cache must be reverted, even if no cleaning was performed upon them.

In step 416 malware is cleaned from the sectors of the shadow copy that include malware. Because the shadow copy at the beginning of the scan is only the hard disk itself, cleaning of a sector from the shadow copy cache only occurs if that sector is modified by malware after scanning of the hard disk has begun but before that particular is scanned. Any such sector of the cache that had also been infected by malware before the beginning of the scan would also have that malware removed by the cleaning.

Any suitable antivirus cleaning software may be used for this purpose. Conceptually, the shadow copy includes two parts: the contents of the hard disk itself and the contents of the shadow copy cache. When a particular sector is requested from the shadow copy at the point in time of the beginning of the scan (or if access to the entire disk is requested), the shadow copy service performs a merge as described above, thus delivering to the requester those sectors of the disk that existed at that particular time. Together, selected contents of the hard disk and of the cache provide a user with a view of the hard disk at a particular point in time.

If the malware exists on the hard disk itself then it will be cleaned from the hard disk. But if the malware exists in a sector or sectors of the shadow copy cache, then the malware will be cleaned from the sectors in the cache. The actual process of cleaning a sector (which may involve removing malware code, changing code, adding information, etc.) does not trigger the shadow copy technology to backup any sector into the cache.

Advantageously, because the cleaning is being performed upon the shadow copy via the shadow copy service, any malware will not be able to lock a file or drop a new file onto the shadow copy. Watchdog malware, for example, will not be able to drop any new files because the malware is removed during the reversion process (and the malware cannot lock files during scanning because the accessing interface is used instead of the operating system API).

Any normal operating system API operation that causes a sector on disk to be changed will cause that sector to be backed up by shadow copy service. Any malware present will be unable to detect that cleaning is being performed because cleaning is also performed using the accessing interface. As pointed out above, even if malware reinfects a sector or file after that sector of file has been cleaned, the original, cleaned sector or file will be backed up to the shadow copy cache and will reinstated below as described in step 424.

In step 420 the invention checks whether any cleaning has been performed on the shadow copy. If so, then control moves to step 424. If not, then no action need be performed in step 428. Alternatively, according to the two scenarios discussed above (original sector is clean, malware modifies a sector after the manual scan is begun), step 420 may elect to transfer control to step 424 in order to revert all sectors present in the shadow copy cache back to the hard disk. This alternative embodiment is a more secure approach, takes more time, but addresses the scenarios where malware modifies a sector after the scan has begun when that sector was initially clean. The default control (control moves to step 424 only if cleaning were performed upon a sector) is arguably slightly less secure but takes less time to complete.

In step 424 the current hard disk is reverted to the cleaned shadow copy view. For example, if any sector on the hard disk had not been changed since the scan was initiated then, of course, that sector would not be written to the cache and that sector will be cleaned in place on the hard disk. This cleaning takes care of any malware that had infected the disk since the previous scan. No copying of a sector from the cache to the hard disk is needed. For these sectors, reversion to the shadow copy simply means using that sector as it exists on the hard disk after scanning and cleaning.

By contrast, if a sector on the hard disk had been modified after the beginning of the scan, then, that original sector will be written to the cache and it will be scanned in the cache. If any malware is found (because that original sector had been infected since the previous scan) then that sector will be cleaned in the cache. In this step, that sector from the cache will be copied and used to overwrite the corresponding sector on the hard disk (because the original sector on hard disk was changed by malware after the beginning of the scan).

Other techniques may be used to revert the hard disk to the shadow copy, aside from copying. In addition, reversion of the hard disk to the shadow copy may be performed on a sector-by-sector basis (that is, only reverting a sector if that sector was cleaned in the shadow copy), or a file basis (that is, reverting a file if any of the sectors of that file were cleaned in the shadow copy).

In step 432 the shadow copy is terminated. In one embodiment, any contents of the shadow disk cache, pointers, and shadow copy identifiers are discarded. In other words, the shadow copy only exists from the beginning of the manual scan to a point in time when scanning and cleaning is done and the hard disk has been reverted to its original, cleaned contents.

As described above, the present invention effectively handles infection of malware during scanning and cleaning. The following example illustrates how the present invention solves the problem of files being modified during a scan, the so-called file consistency problem. Assume that at time=1 a hard disk exists with all original sectors, no malware is present and there is nothing in the shadow copy cache. At the time=2 a scan is begun, and a shadow copy at this time is initiated. During the scan, but before a sector A is scanned, malware modifies sector A to create sector A' on the hard disk. Using the shadow copy technology, sector A (the original) is saved into the cache because it was modified. During scanning, this sector A is scanned as it exists in the cache because it did exist at time=2 (the beginning of the scan). The modified sector A' (on the hard disk) is not scanned because it did not exist at time=2. Once the scanning and cleaning is completed, if no malware is found in sector A in the cache then the hard disk is not reverted to this sector. The modified sector A' will be scanned the next time the manual scan is performed. This approach corresponds to the first embodiment discussed above that takes less time to complete.

On the other hand, if original sector A in the cache does contain malware (because it was modified by malware before the scan was begun), then this sector will be cleaned in the cache and it will be copied back to overwrite the sector on the hard disk, thus a erasing modified sector A'.

It is possible that legitimate changes may be made to the hard disk during scanning and cleaning that are not caused by malware but are caused by normal user actions. Preferably, the user will be prompted to stop current work, save data, and terminate running processes before scanning occurs.

COMPUTER SYSTEM EMBODIMENT

Figure 9A:
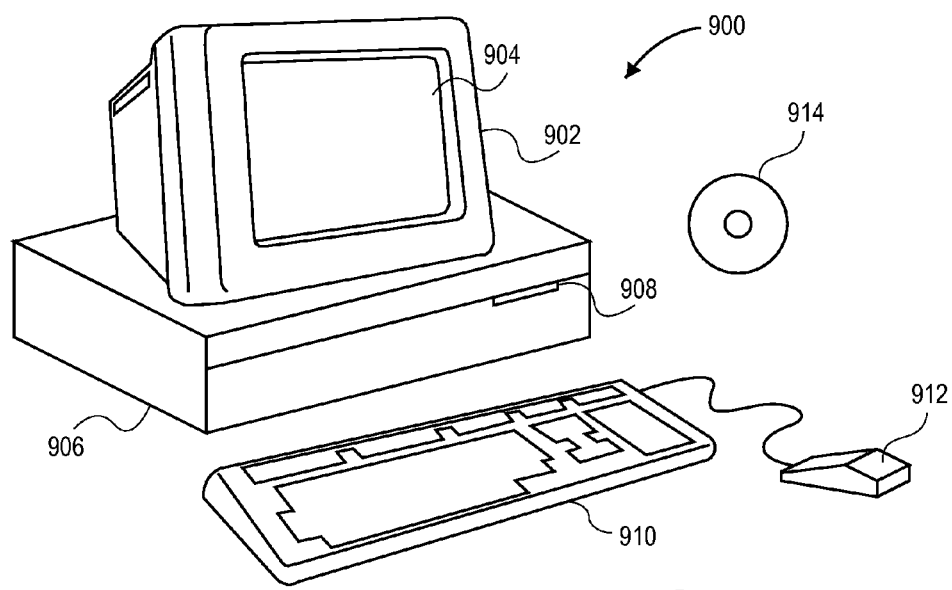
FIGS. 9A and 9B illustrate a computer system suitable for implementing embodiments of the present invention.
Figure 9B:
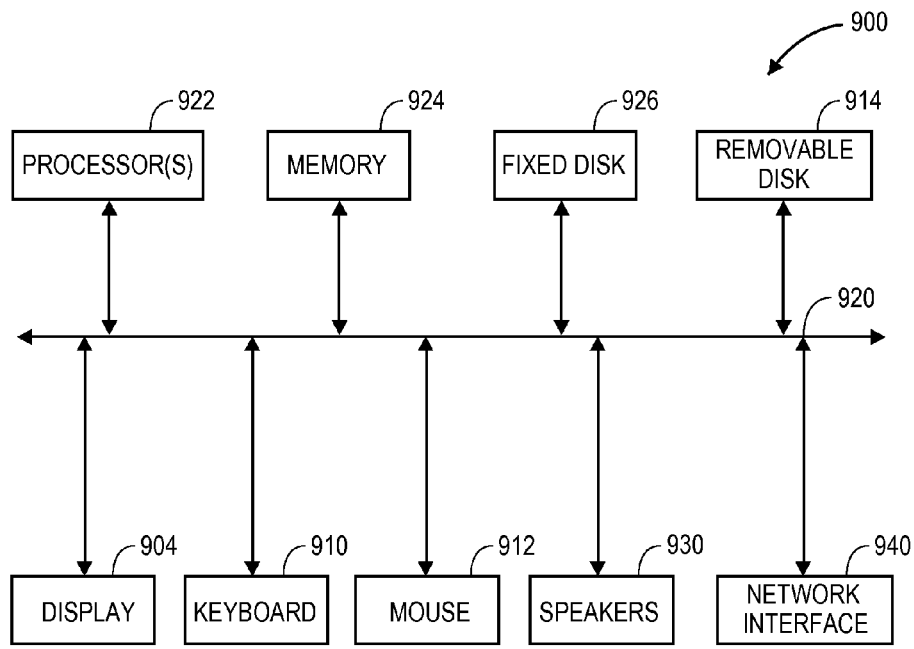

FIGS. 9A and 9B illustrate a computer system 900 suitable for implementing embodiments of the present invention. FIG. 9A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 9B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of cleaning a hard disk of a computer, said method comprising:
    starting a manual scan of said hard disk of said computer;
    initiating a shadow copy of said hard disk, said shadow copy providing a snapshot of said hard disk at said starting of said manual scan;
    scanning sectors of said shadow copy of said hard disk using antivirus scanning software;
    cleaning sectors of said shadow copy that contain malware; and
    reverting said hard disk to said shadow copy of said hard disk.

2. A method as recited in claim 1, further comprising:
    filtering requests to modify sectors of said hard disk during said scanning and cleaning;
    determining that a request is being made to modify a first sector of said hard disk;
    copying said first sector to a shadow copy cache; and
    allowing said first sector to be modified on said hard disk.

3. A method as recited in claim 1, further comprising:
    said reverting including copying of sectors from said shadow copy cache to their corresponding sectors on said hard disk.

4. A method as recited in claim 1, further comprising:
    determining if a sector of said hard disk has been cleaned in said shadow copy; and
    reverting said hard disk to said sector of said shadow copy when it is determined that said sector has been cleaned.

5. A method as recited in claim 1, further comprising:
    scanning said shadow copy of said hard disk using a disk parser, whereby an API of the operating system of said computer is not used to perform said scanning.

6. A method as recited in claim 1, further comprising:
    scanning said shadow copy of said hard disk using an accessing interface that does not rely upon an API of the operating system of said computer.

7. A method as recited in claim 1, further comprising:
    performing said step of reverting even if no cleaning has been performed.

8. A method of cleaning a hard disk of a computer, said method comprising:
    starting a manual scan of said hard disk of said computer;
    initiating a shadow copy of said hard disk, said shadow copy providing a snapshot of said hard disk at said starting of said manual scan;
    performing antivirus scanning of sectors of said shadow copy of said hard disk using an accessing interface to access said shadow copy;
    cleaning sectors of said shadow copy that contain malware;
    backing up a sector of said hard disk to a shadow copy cache when a request is made to modify said sector during said scanning and cleaning; and
    reverting said hard disk to said shadow copy of said hard disk after said scanning and cleaning.

9. A method as recited in claim 8, further comprising:
    filtering requests to modify sectors of said hard disk during said scanning and cleaning;
    determining that a request is being made to modify a first sector of said hard disk;
    copying said first sector to a shadow copy cache; and
    allowing said first sector to be modified on said hard disk.

10. A method as recited in claim 8, further comprising:
    said reverting including copying of sectors from said shadow copy cache to their corresponding sectors on said hard disk.

11. A method as recited in claim 8, further comprising:
    determining if a sector of said hard disk has been cleaned in said shadow copy; and
    reverting said hard disk to said sector of said shadow copy when it is determined that said sector has been cleaned.

12. A method as recited in claim 8 wherein said accessing interface does not rely upon an API of the operating system of said computer.

13. A method as recited in claim 8 wherein said accessing interface is a disk parser.

14. A method as recited in claim 8 wherein said accessing interface uses hardware instructions to access sectors of said shadow copy.

15. A method as recited in claim 8, further comprising:
    delaying a period of time after said step of cleaning to allow for malware activity before said step of reverting.

16. A system for cleaning malware from a computer, said system comprising:
    a hard disk of said computer including a plurality of sectors;
    a shadow copy cache arranged to store sectors from said hard disk;
    a shadow copy service software module arranged to maintain a shadow copy of said hard disk at a particular point in time and to backup at least one of said sectors to said shadow copy cache;
    an accessing interface arranged to provide access to said shadow copy;
    antivirus scanning software arranged to scan and clean sectors of said shadow copy via said accessing interface, said shadow copy service software module being further arranged to initiate said shadow copy of said hard disk at the beginning of a scan of said hard disk; and
    a reversion software module arranged to revert said hard disk to said shadow copy after scanning and cleaning by said antivirus scanning software.

17. A system as recited in claim 16, further comprising:
    a shadow copy filter arranged to filter requests for sector modifications of said hard disk and to backup sectors from said hard disk to said shadow copy cache.

18. A system as recited in claim 17 wherein said shadow copy filter filters said requests during said scanning and cleaning by said antivirus scanning software.

19. A system as recited in claim 16, wherein said accessing interface is a disk parser or hardware instructions.

20. A system as recited in claim 16, wherein said accessing interface does not rely upon a file system interface or an API of the operating system of said computer.

21. The method as recited in claim 1 wherein said shadow copy includes sectors on said hard disk and sectors in a shadow copy cache.

22. The method as recited in claim 8 wherein said shadow copy includes sectors on said hard disk and sectors in a shadow copy cache.

23. The system as recited in claim 16 wherein said shadow copy includes sectors on said hard disk and sectors in said shadow copy cache.

* * * * *